Oct. 5, 1943. A. L. KURTZ 2,331,031
DIGESTION OF SEWAGE SOLIDS AND LIKE MATTER
Filed Oct. 12, 1940 3 Sheets-Sheet 1

FIG. I.

A. LAWRIE KURTZ.
INVENTOR.

BY George A. Evans
ATTORNEY.

Oct. 5, 1943.    A. L. KURTZ    2,331,031
DIGESTION OF SEWAGE SOLIDS AND LIKE MATTER
Filed Oct. 12, 1940    3 Sheets-Sheet 2

A. LAWRIE KURTZ.
INVENTOR.

BY  *George A. Evans*
ATTORNEY.

Patented Oct. 5, 1943

2,331,031

UNITED STATES PATENT OFFICE 2,331,031

DIGESTION OF SEWAGE SOLIDS AND LIKE MATTER

Adolph Lawrie Kurtz, Milwaukee, Wis., assignor to Chain Belt Company, Milwaukee, Wis., a corporation of Wisconsin Application October 12, 1940, Serial No. 360,897

9 Claims. (Cl. 210—2)

The digestion of sewage solids and other water borne waste matter is the bio-chemical decomposition of its organic portions into more stable compounds under conditions and with facilities which speed up the action, permit the collection of usable end products and do not create a nuisance. This digestion is caused by certain types of bacteria feeding on the solids and is usually accomplished in one or more closed containers called digestion tanks.

It is the general practice to subject the sewage to a clarifying or sedimentation treatment step in which there is a settling and collecting of the solid matter, sometimes called sludge and a transfer of such matter from the one or more sedimentation tanks to the one or more digestion tanks by means of a system of pipes or conduits in conjunction with pumps. After the sludge has been detained in the digestion tank or tanks for a length of time sufficient to permit the desired amount of bacterial action, it is removed from the digestion tank and space is then available for the digestion of additional sludge from the sedimentation tank or tanks.

The transfer of sludge from the sedimentation tanks to the digestion tanks occurs relatively frequently, possibly as often as once or twice a day depending on the type of sewage which is being treated, and the apparatus available, more frequent removal tending to prevent the creation of septic conditions in the sedimentation tanks.

The sludge collected in the digester is retained there for a relatively long period of time, the length of treatment depending upon the character of the sludge and also to a certain extent upon the temperature conditions prevailing as well as whether the digestion is completed in one or two stages. In any event, there is a much longer period of time between removals of digested sludge (which in the case of a conventional, single stage digester may be considered as much as sixty days) and the time interval between the successive chargings of raw sludge in the digester, which as stated, may be as frequent as several times a day.

During the stabilization or digestive process there is a physical separation, which may be termed a dehydration of sludge, resulting in, or tending to produce, a deposition of concentrated solids at the bottom of the digester, above which lies a body of supernatant liquid. As the latter is relatively clear, it is the general practice to displace such liquid during the introduction of raw sludge and return the same to the sedimentation tank.

One of the end products of the digestion of sludge is a mixture of gases which can be burned to produce heat or power and which are collected in a suitable dome or cover over the tank. It is highly important that the gases so collected be kept separate and not allowed to mix with air as oxygen in the digestion tank tends to destroy bacterial action and when mixed in proper proportions with the gases forms an explosive mixture. Further, it is important that the space in the tank or dome available for gas collection should be maintained as nearly constant as possible in order that its pressure be influenced only by the rate of production and use. Whether the cover is a separate or integral part of the digestion tank, the liquid level is preferably above its under surface in order that the solids lifted by the ebullition of the gas and forming a scum above the supernatant liquid should at all times be submerged and decomposition continue.

These conditions in the past have been obtained by the use of floating covers or have been partially obtained during the withdrawal of digested sludge by re-admitting previously collected gas in a volume equal to the amount of digested sludge withdrawn.

Under the use of floating covers, the cover rises and falls with the liquid level, since it is at all times floating thereon. The objection to this practice is the initial cost of the cover and also the degree of care required in withdrawing supernatant liquor from the tank to insure that it is being withdrawn at the proper level. Floating covers require guides and rollers in order that they may move vertically relative to the tank without binding and consequently the structure is complicated and expensive.

When previously collected gas is used, it is necessary that a sufficient supply be maintained at all times either under pressure or in a variable volume tank. Both require expensive apparatus and until raw sludge in sufficient volumes to again fill the digestion tank has been added, the scum is not submerged.

It is an object of the present invention to provide an improved system for the digestion of sewage sludge whereby the conditions for efficient digestion previously mentioned may be obtained economically and with practically no attending troubles or care. According to one aspect of the invention, it is an object to provide automatic means for maintaining a constant volume of liquid within the digester regardless of the rate of introduction and/or withdrawal of sludge.

The foregoing system may be arranged in circuit with various elements in a sewage treatment or waste disposal plant, and is not dependent upon any particular kind of treatment, so long as the principles and means hereafter described are carried out.

According to another aspect of the invention, it is an object to provide a novel arrangement of stages of digestion treatment wherein the advantages of the system previously mentioned may be utilized to more economically and efficiently promote the digestive process. The advantages of such arrangements, as will be more particularly described hereinafter, lie in the economies of design and the facility with which the various elements of the system may be combined for effective treatment of the waste matter.

Other objects and features embodied in the invention will be better appreciated by reference to the accompanying drawings and detailed description in connection therewith. By the arrangement and particular elements shown in the drawings, I have endeavored to disclose a preferred embodiment of the invention. It must be realized, however, that various other arrangements and embodiments of the invention may be obtained without departing from the scope and basic aspects of this disclosure. In these drawings, like base numbers will be used to designate like elements throughout, in which drawings.

Figure 1:
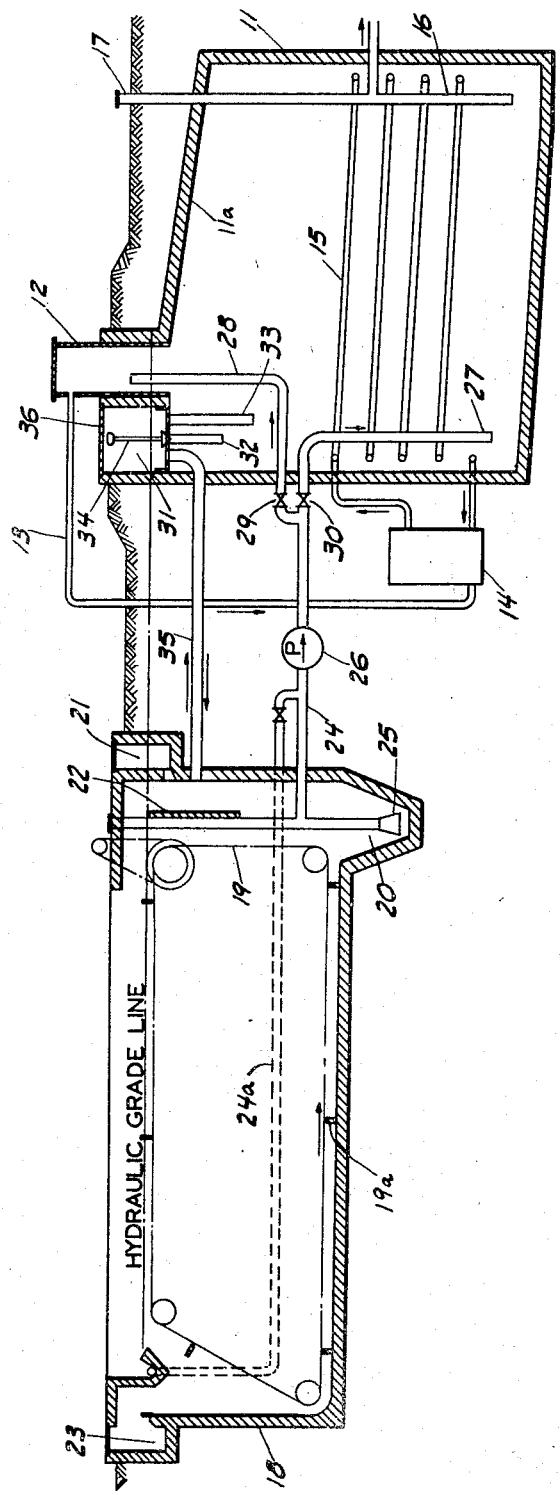
Figure 1 is a diagrammatic view showing a layout for a digestion system arranged in communication with a sedimentation tank.

In Figure 1, a digestion tank 11 with concrete walls and cover 11a is buried in the ground, the tank having a sloping bottom toward the sludge outlet. The roof portion or cover contains a gas dome 12, communicating with the highest portion of the sloping roof to facilitate gas collection. A pipe line 13 conducts gas from the dome 12, one use for which may be in a gas burner 14 arranged to heat water circulating through pipes 15 coiled around the inside of the digestion receptacle. In this manner the interior of the tank is maintained at a temperature most conducive to the rapid decomposition of organic matter. Suitable sludge removal facilities are indicated by pipe 16 opening near the bottom of the digester, the pipe, as shown, to be used when discharge is to be at an elevation below the level of the sewage in the digestion tank. Appropriate pipe connection to sludge pump 26 may be made if discharge is to be at a higher elevation. In either case the general piping arrangement within the digestion tank is T-shaped with a vertical section 17 forming an extension of the sludge inlet and running through the digestion tank cover and terminating with a tight but removable cover, to permit cleaning of the inlet pipe should it become clogged.

The digestion tank shown in this drawing communicates with a settling compartment or tank 18 which is preferably rectangular in horizontal sections and in which collector mechanism generally designated 19 (consisting of parallel chain strands connected by transverse flights 19a) is arranged to move settled solids across the floor of the tank to a hopper or sump 20. The sewage undergoing treatment is introduced into tank 18 from an influent channel 21 arranged at the top of the tank preferably at the same end as the sludge removal means. The flow of incoming sewage in the sedimentation tank is directed across the width of the tank by means of a baffle 22 arranged transversely of the tank a short distance from the influent opening.

In the sedimentation chamber, the rate of flow is controlled to facilitate the deposition of solids, thus reducing the strength of the sewage and bringing about what is commonly known as a primary clarification. After flowing through the tank 18, the sewage is conducted into an effluent chamber 23 from whence it is given such secondary treatment as is necessary or can be afforded. Sometimes treatment such as flocculation precedes sedimentation, a variation which is immaterial insofar as the present invention is concerned, the present invention being independent of the particular mode of treatment which is employed.

For transferring matter which has settled in the tank 18 to the digester 11, a sludge line 24 connects the two tanks, sludge inlet 25 being disposed within the hopper 20, a pump 26 facilitating transfer. Also communicating with line 24 may be a scum line 24a connected to a scum trough which is arranged near the effluent end of tank 18 in a manner well known in the art. Normally sludge is discharged near the bottom of the tank 11 through pipe 27 at a point remote from digested sludge outlet 16, but at intervals, sludge may be discharged into the gas dome 12 by means of branch pipe 28 and valves 29 and 30, to thereby break up any deleterious accumulation of scum which may have formed in the lower portion of dome.

Disposed to one side of the gas dome 12 and superimposed above the digester tank is a compartment 31 which will hereinafter be designated the supernatant box. This box which provides space below the hydraulic grade line, as illustrated in Figure 1, has one or more pipes 32 and 33 attached to the bottom and extending into the digester compartment, the length of the pipes being such as to insure communication with the supernatant beneath the layer of solids or scum forming at top of the tank. Since it is impossible to predict just how thick the layer of such matter may be, depending as it does on the character of sewage, several pipes of different lengths may be employed and suitable means, such as a conical plug 34, inserted into the opening of the pipe or pipes not employed.

Also communicating with the supernatant compartment 31 is a pipe line or duct 35, which will hereinafter be referred to as the equalizing pipe, the other end of which leads into the sedimentation tank 18. Preferably this latter line communicates with tank 18 at a point below the influent opening and ahead of the baffle 22, in order that supernatant liquid discharged from the digestion tank may be dispersed with the incoming sewage in the tank. By providing the outlet at the upper region of tank 18, there is a re-sedimentation of returned liquor, the point of return being functionally remote from the sludge take-off point 25 on line 24.

By means of duct 35, there is constant hydraulic communication between the supernatant compartment and the liquid in the settling tank. To accomplish such communication, the bottom of the box 31 is arranged below the liquid level in the settling tank. Consequently, regardless of fluctuations of the level of the liquid in the settling tank, there will always be means for maintaining the same level of liquid in the digester as in the settling tank, and since the level of liquid in the latter is practically constant, due to the relatively large reservoir capacity of the sedimentation tank, there will be only slight variations in the volume of liquid in the digester. Preferably the supernatant box 31 is enclosed, a flat cover 36 being found satisfactory for this purpose. Furthermore by provision of a readily removable cover 36, the supernatant in compartment 31 may be easily inspected and sampled.

By means of pipe 24, raw sludge may be pumped into the digester 11 whenever a sufficient quantity has collected in the settling tank 18. The introduction of this sludge causes a displacement of supernatant liquid in the digester and, as a result thereof, the supernatant is forced up one of the pipes 32 or 33 (whichever is in use) into the supernatant box from whence it returns to the settling tank through the line 35. On the other hand, when sludge is removed from the digester for subsequent treatment or drying, there is a flow of liquid from the settling tank through the equalizer pipe and supernatant box to replace digested sludge which is removed. As a result, the level of liquid in tank 11 is automatically maintained at a substantially constant level at all times, and as clearly indicated in Figure 1, the level of liquid in the digester is above the digester cover 11a, or in other words, extends a short distance into the lower portion of the gas dome, whereby the floating scum in the tank is constantly maintained under pressure against the lower side of the digester cover.

Figure 2:
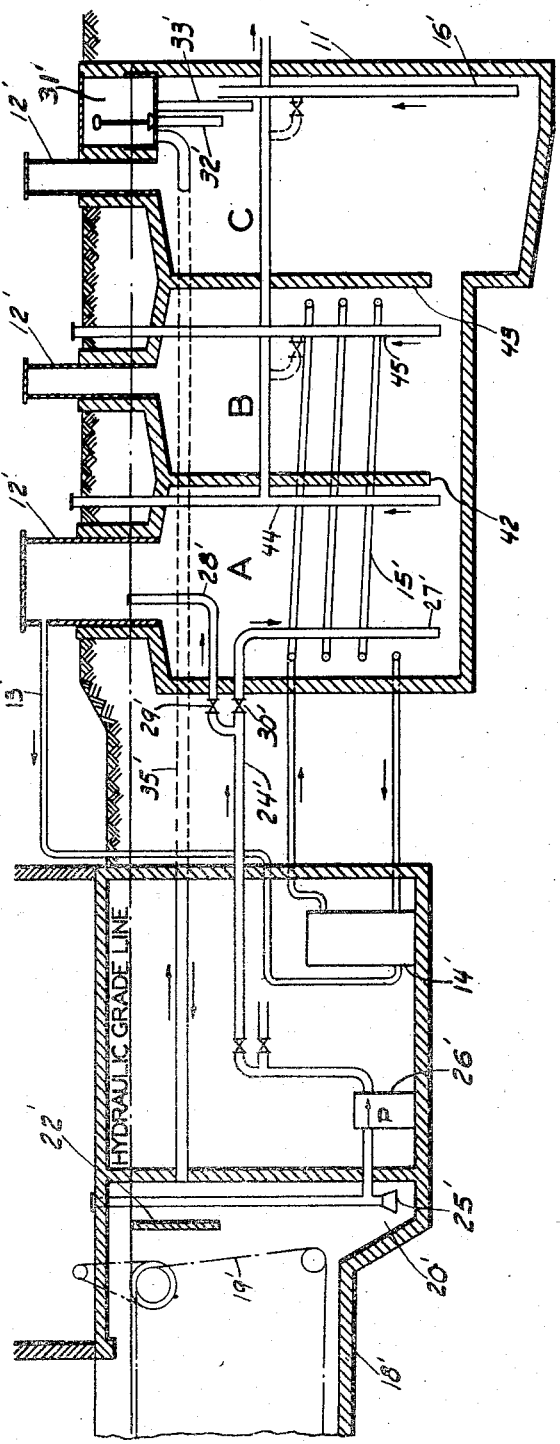
Figure 2 is a diagrammatic view of a multiple-stage digestion system arranged in circuit with a sedimentation tank, showing more in detail various features of the invention.
Figure 3:
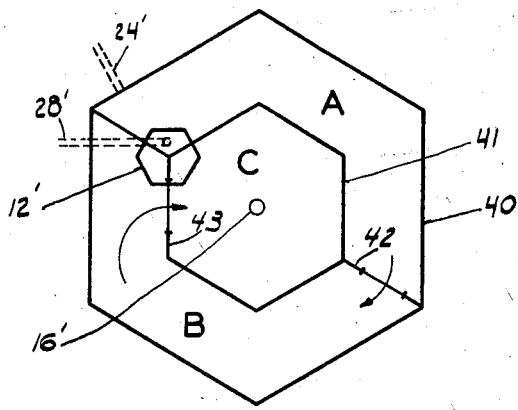
Figure 3 is a plan view, intended to be diagrammatic, of a digestion tank such as is illustrated in Figure 2, this tank being arranged for multiple-stage digestion.
Figure 4:
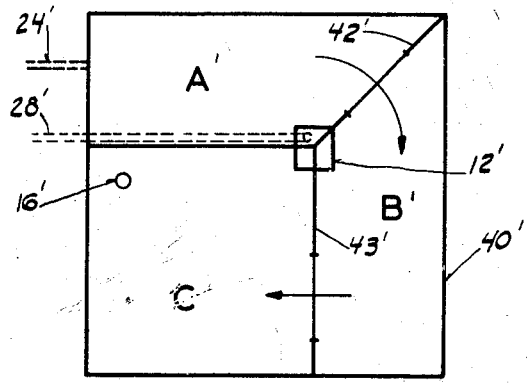
Figure 4 is a plan view of a modified form of digestion tank arrangement, embodying stage treatment, said view being diagrammatic and similar to Figure 3.
Figure 5:
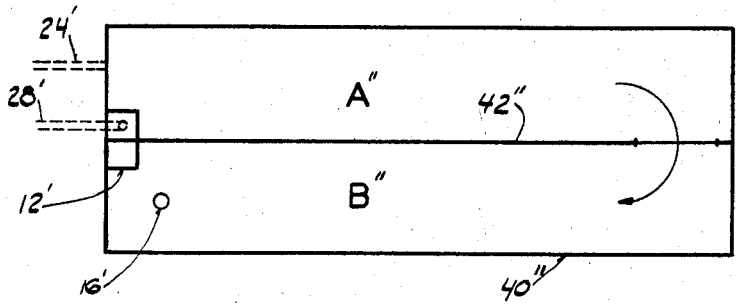
Figure 5 is a still further modification, being a plan view showing a rectangular digester arranged for stage treatment.

The arrangement shown in Figure 2 should be considered in connection with Figures 3, 4 and 5, inasmuch as the multiple-stage tank shown in Figure 2 is intended to be a diagrammatic representation of either of the modified arrangements shown in Figures 3, 4 or 5, Figure 2 showing the separate compartments unfolded and laid out flat.

In Figure 3, for instance, the vertical exterior walls 40 of the tank are arranged in hexagonal form or they may be of any form with an internal dividing wall 41 disposed concentrically of the external walls. Vertical partitions 42 and 43 divide the external compartment into two sub-compartments, the dividing walls being spaced a short distance from the bottom or floor of the tank, as illustrated in Figure 2, to permit sludge to pass from one digesting compartment under the walls into the next compartment. If only two compartments are desired, the wall 42 may be removed and a single outer compartment then completely surrounds the inner compartment C. With respect to these three compartments, designated A, B and C, the operation will be briefly described.

Sludge from the settling tank is pumped through pipe 24' into compartment A. Normally branch pipe 27' is employed to bring the sludge into the tank at a point near the bottom in order that, in rising, the incoming matter may be well dispersed and properly inoculated with the sludge already undergoing digestion in the compartment. Heating coils 15', encircling the tank, heat compartments A and B, but do not pass through the inner compartment C, as this compartment will be maintained at the proper temperature by the surrounding compartments A and B.

A gas dome 12' (illustrated in Figure 2 as unfolded, but intended as one dome) is disposed within the cover and is so located that it communicates with each of the compartments, with the result that gas evolving during the successive stages of digestion may be collected at one point and used for heating purposes as previously described. The use of single dome for a plurality of compartments greatly reduces the area which is not covered by the roof and beneath which the scum is not submerged. A secondary branch pipe 28' may be used to conduct sludge from the settling tank into the digester dome at a point above the liquid level to break up scum collecting therebeneath.

The supernatant box 31' is preferably in communication with the final compartment C in order that supernatant returned to the settling tank, which is in the primary circuit of the system, may be relatively clear as an end product of the digestive treatment. The construction of the supernatant box and the piping will not be described in detail, as it has already been described in connection with Figure 1, but it should be pointed out that the arrangement here disclosed again permits utilization of constant hydraulic communication between sedimentation and digestion tank, the use of a common gas dome further insuring a constant level of liquid in all compartments of the digestion tank, which level, as previously described, is preferably above the scum layer in the compartments. These subsequent arrangements emphasize the flexibility of the system and its adaptability to multi-stage digestion.

In Figure 4 the external contour of the digester is square and, instead of arranging the compartments in a concentric manner, each compartment A', B' and C' borders on the outside of the tank, a common gas dome 12' communicating with each compartment, said dome being disposed above the merging point of the three internal dividing walls.

A still further modification is shown in Figure 5, in which the digester is rectangular in shape with a dividing wall 42'' dividing the tank into two compartments A'' and B''. The underpass is preferably at the end of the tank remote from the sludge inlet 24' as indicated by the arrow, and the gas dome 12' is disposed near the inlet end of the tank.

In each of the three different stage-arrangements illustrated, suitable removal means such as pipe 16' is provided for withdrawing the digested sludge from the last compartment in the digestion system. Sludge removal may be assisted by sloping bottom floors, and independent sludge removal pipes 44 and 45 (see Figure 2) may be provided in each compartment to draw off sludge separately therefrom if desired.

While it is most desirable that the equalizer pipe designated 35 in Figure 1 and 35' in Figure 2, should communicate with the primary settling tank, it will be realized that communication may be had with any point in the primary circuit of the treatment plant where the liquid level is maintained substantially constant and the volume of the receptacle is sufficient to maintain, or the flow conditions capable of maintaining, such level despite withdrawals of sludge from the digester. As previously explained, the volume of liquid in the settling tank and flow conditions therein are such that during the removal of sludge from the digester, liquid will be replaced without substantially affecting the head in the settling tank, and consequently the volume of liquid in the digester is unaltered. When supernatant is displaced, by the introduction of sludge to the digester, there is an opportunity for re-clarification of the supernatant in the primary circuit of the sewage treatment.

The advantages of the present invention will be especially valuable in plants which cannot maintain the trained personnel necessary for regulating the complicated mechanisms in use at the present time for digestive treatment. The invention is not intended to be limited to any particular use, however, nor are arrangements other than those disclosed in the embodiments herein intended to be abandoned, the only limitations being those expressed in the following claims:

1. In the digestion of settleable sludge contained in sewage, a tank having a cover, a substantially vertical partition wall dividing said tank into a plurality of compartments for stage-digestion of sludge, means providing communication between said compartments, means for introducing raw sludge into one compartment and means for withdrawing digested sludge from another compartment, a gas dome disposed within the cover and communicating with each of said compartments, and means for introducing sewage into said digestion tank to replace sludge removed therefrom.

2. The combination of elements expressed in claim 1, in which the means for introducing sewage communicates with the upper portion of that compartment from which the digested sludge is withdrawn from the digestion tank.

3. A tank for digesting sludge deposited from sewage comprising an initial and a secondary compartment, a common cover for said compartments, means providing communication for sludge between said compartments, means for introducing raw sludge into the initial compartment, a single gas dome disposed within said cover and communicating with each of said compartments, means for removing digested sludge from the secondary compartment, and means for introducing sewage into said digestion tank to replace sludge removed therefrom.

4. In sedimentation and bio-chemical decomposition of sludge, the combination of a sedimentation tank; a digestion tank having a plurality of compartments; means for collecting sludge in said sedimentation tank; means for transferring such collected sludge to the first compartment of said digestion tank; means providing communication for sludge between said compartments; means for removing digested sludge from the last compartment; and means providing constant hydraulic balance between the supernatant liquid in said last compartment and the sewage in the sedimentation tank.

5. In apparatus for the treatment of sewage or similar waste liquors bearing settleable solids, a sedimentation tank having an inlet for raw sewage and an overflow outlet, said tank being adapted for receiving and retaining a relatively large body of liquid for a period of time sufficient for quiescent sedimentation of the solids borne thereby to form a sludge; a separate closed digestion tank having a chamber in its upper portion for collecting gases evolved by the sludge in the course of its digestion; means for withdrawing sludge and liquid from the sedimentation tank and forcibly transferring them to the digestion tank; means for withdrawing digested sludge from the latter tank; and means for maintaining the volume of said gas collecting chamber substantially constant, comprising a constantly open conduit connecting the upper portions of said tanks and disposed below said overflow outlet.

6. In apparatus for the treatment of sewage or similar waste liquors bearing settleable solids, a sedimentation tank for receiving and retaining a relatively large body of liquid for a period of time sufficient for quiescent sedimentation of the solids borne thereby to form a sludge, said tank having an inlet for raw sewage and an overflow outlet; a separate digestion tank having a fixed cover below the level of liquid in the sedimentation tank; means for withdrawing sludge and liquid from the sedimentation tank and forcibly transferring them to the digestion tank; means for withdrawing digested sludge from the latter tank; and means for continuously maintaining scum forming on the supernatant liquid in said digestion tank in contact with said cover, comprising a constantly open conduit connecting said tanks and disposed below said overflow outlet.

7. In combination, a settling tank for sedimentation of sewage solids, a digester having a cover, means for collecting solids in said sedimentation tank and for transferring them to said digester, means for removing digested solids from said digester, a supernatant compartment disposed within the cover providing space below the level of liquid in said settling tank, open pipe means maintaining constant communication between said settling tank and said compartment through which liquid may flow by gravity from the sedimentation tank to the compartment during removal of sludge from the digester and means connecting said compartment with the supernatant liquid in the digester.

8. In the digestion of sewage sludge, a tank having a cover, a substantially vertical partition dividing said tank into two compartments, one compartment substantially surrounding the other, means for introducing raw sludge into the outer compartment, means for transferring sludge from the outer compartment to the inner compartment, a gas dome contained in the cover and communicating with each of said compartments, and means for heating the outer compartment to promote digestion therein, the arrangement of the compartments being such that the heat applied to the outer compartment heats the sludge undergoing treatment in the inner compartment as well as that in the outer compartment.

9. In the digestion of sewage sludge, a tank having a cover rigidly secured thereto and a bottom floor, a substantially vertical partition dividing said tank into a plurality of compartments, said partition extending from said cover to a point, a distance above said floor, whereby sludge may pass from one compartment into the other, means for introducing raw sludge into one compartment, means for withdrawing digested sludge from another compartment, a gas dome disposed in the cover and communicating with the liquid in each of said compartments, and means for withdrawing supernatant liquid from the upper portion of that compartment from which the digested sludge is finally withdrawn.

ADOLPH LAWRIE KURTZ.